United States Patent [19]

Harvey

[11] Patent Number: 4,707,102
[45] Date of Patent: Nov. 17, 1987

[54] FILM SPEED SETTING REMINDER MECHANISM

[75] Inventor: Donald M. Harvey, Webster, N.Y.

[73] Assignee: Eastman Kodak Company, Rochester, N.Y.

[21] Appl. No.: 2,469

[22] Filed: Jan. 12, 1987

[51] Int. Cl.⁴ ............................................. G03B 17/20
[52] U.S. Cl. ................................. 354/289.1; 354/219; 354/288
[58] Field of Search ............... 354/21, 219, 288, 289.1

[56] References Cited

U.S. PATENT DOCUMENTS

| | | | |
|---|---|---|---|
| 3,112,682 | 12/1963 | Frost et al. | 354/456 |
| 3,601,024 | 8/1971 | Pagel | 354/21 |
| 4,077,041 | 3/1976 | Imura | 354/21 |
| 4,200,371 | 10/1977 | Suzuki et al. | 354/21 |
| 4,220,405 | 9/1980 | Stemme et al. | 354/21 |

FOREIGN PATENT DOCUMENTS 59-121030 7/1984 Japan .
59-121031 7/1984 Japan .

*Primary Examiner*—A. A. Mathews
*Attorney, Agent, or Firm*—Roger A. Fields

[57] ABSTRACT

In a photographic camera, a film speed setting member is manually movable to a plurality of film speed related positions corresponding to various speed films to be used in the camera. When a rear door of the camera is opened to load a selected speed film in the camera, the setting member is automatically moved to a non-film speed related position in which it at least partially blocks a window of the viewfinder in the camera. This serves to remind the photographer to move the setting member to the film speed related position corresponding to the speed of the loaded film before taking the first picture.

4 Claims, 2 Drawing Figures

FILM SPEED SETTING REMINDER MECHANISM

BACKGROUND OF THE INVENTION

1. Field of the Invention

The invention relates generally to the field of photographic cameras. More particularly, the invention relates to a camera in which there is provided an improved mechanism for reminding the photographer to set a film speed (sensitivity) setting member to a position representative of the speed of unexposed film in the camera before taking the first picture.

2. Description of the Prior Art

It is well known in the art relating to photographic cameras to provide a camera with a manually operated film speed setting member. Typically, the setting member is movable to a plurality of film speed related positions, e.g., ISO 100, 200, 400 and 1000, corresponding to the various speed films with which the camera is intended to be used. When the photographer moves the setting member to a selected position, an adjustment is made to the exposure control means in the camera which is used in the determination of the correct exposure of the film during picture-taking. One of the problems that is encountered, however, is that the photographer does not always remember to move the setting member to the correct position after he or she has loaded unexposed film in the camera. As a result, the film will be underexposed or overexposed during picture-taking.

Prior art devices for reminding a photographer to move a film speed setting member to a position representative of the speed of unexposed film in the camera are disclosed in Japan applications (Kokai) No. 59-121030 and 59-121031, opened for public inspection on July 12, 1984. In the first Japan application, a locking pin is spring urged outwardy at the rear of the camera in response to the opening of a back door of the camera. The locking pin during movement to its extended position pivots a release lever which releases a manually operated film speed setting slide for spring urged movement to engage the locking pin. When engaged in its extended position, the locking pin prevents the back door from being closed. This serves as a reminder to the photographer, after unexposed film is loaded in the camera, to move the film speed setting slide to a position representative of the speed of the loaded film. In the film speed related position, the film speed setting slide is disengaged from the locking pin, permitting the locking pin to be moved inwardly to allow the back door to be closed. The other Japan application is similar to the first one except that a shutter release button is prevented by the film speed setting slide from being depressed until the slide is reset to a film speed related position.

Preventing the back door from being closed or preventing the shutter release button from being depressed as in the two Japan applications, in order to remind the photographer to move a film speed setting member to a position representative of the speed of unexposed film in the camera, is not without certain problems. For example, in the first application, the photographer may accidentally deform the back door in the vicinity of the locking pin should he or she attempt to close the door without first resetting the film speed setting slide to the position corresponding to the speed of the loaded film. Alternatively, in the other Japan application, the opportunity to take a picture may be lost because the shutter release button cannot be depressed until the photographer resets the film speed setting slide.

SUMMARY OF THE INVENTION

The invention provides an improved apparatus for reminding a photographer to set a film speed setting member to a position representative of the speed of unexposed film in a camera before taking the first picture.

According to the invention, a film speed setting member manually movable to a plurality of film speed related positions is automatically moved in response to the opening of a rear door of the camera to a non-film speed related position. In the non-film speed related position, the setting member at least partially blocks a window of the viewfinder in the camera. This serves to alert the photographer to move the setting member to a film speed related position corresponding to the speed of unexposed film loaded in the camera, but it does not prevent a picture from being taken as in the prior art examples described above.

DESCRIPTION OF THE PREFERRED EMBODIMENT

The invention is disclosed as being embodied preferably in a 35 mm camera. Because the features of this type of camera are generally well known, the description which follows is directed in particular to photographic elements forming part of or cooperating directly with the disclosed embodiment. It is to be understood, however, that other elements not specifically shown or described may take various forms known to persons of ordinary skill in the art.

Figure 1:
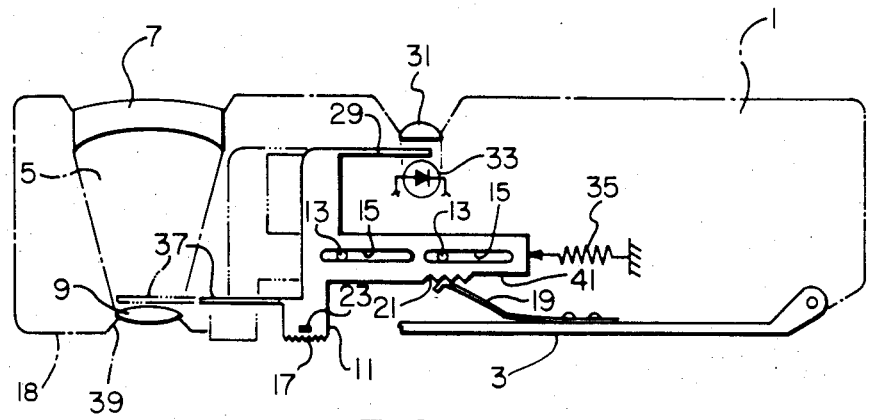
FIG. 1 is a top plan view of a photographic camera with the camera housing cut away to show a film speed setting reminder mechanism according to a preferred embodiment of the invention.
Figure 2:
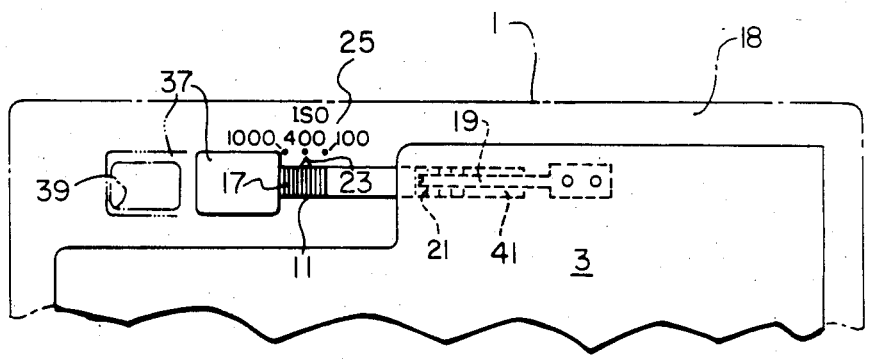
FIG. 2 is a rear elevation view of the camera as depicted in FIG. 1.

Referring now to FIGS. 1 and 2 of the drawings, there is shown certain details of a 35 mm camera having a camera body 1 on which is pivotally mounted a back door 3. A conventional optical viewfinder 5 including a rectangular negative finder lens 7 and a square positive finder lens 9 is provided in the camera body 1 for viewing an erect image of the subject to be photographed. A manually operable film speed setting slide 11 is supported for translation within the camera body 1 by a pair of pins 13, fixed to the camera body, which extend through respective slots 15 in the slide. A serrated or knurled portion 17 of the slide 11 extending outside of the camera body 1 through a light-trapping slot, not shown, in a rear face 18 of the camera body is grippable by the photographer to manually move the slide to a plurality of film speed related positions corresponding to various speed films that can be used with the photographic camera. A spring-like finger 19 mounted on the inside of the back door 3 projects inwardly from the door to engage successive notches 21 on the slide 11 in order to releasably retain the slide in the respective film speed related positions. A pointer 23 extending from the grippable portion 17 of the slide 11 is alignable with various film speed indications 25, e.g., ISO 100, 400 and 1000, visible on the rear face 18 of the camera body 1, to enable the photographer to locate the slide in its respective film speed related positions. An attenuating portion 29 of the slide 11 is moved progressively between a light-gathering lens 31 and an exposure control photocell 33 as the slide is moved from its film speed related position corresponding to ISO 100 to its film speed related position corresponding to ISO 1000, to vary the amount of ambient light reaching the photocell. This adjustment is used by a known automatic exposure control circuit, not shown, in determining the correct film exposure during picture-taking.

When the back door 3 is opened to insert a standard 35 mm film cartridge, not shown, into the camera body 1, the spring-like finger 19 will separate from one of the notches 21 on the slide 11, thereby releasing the slide for movement by a compression spring 35 to a non-film speed related position shown in phantom lines in FIGS. 1 and 2. In the non-film speed related position, a signalling portion 37 of the slide 11 extends across a rear window 39 of the optical viewfinder 5 to block the window in whole or in part. When the back door 3 is closed, the signalling portion 37 remains in the window 39 to alert the photographer to reset the slide 11 to the correct film speed related position before taking the first picture. However, picture-taking is not prohibited as in the prior art examples described above. A straight edge 41 may be provided on the slider 11, in line with the notches 21, to facilitate movement of the spring-like finger 19 into the first notch (after the back door 3 is closed) as the slider is moved to its first film speed related position.

Although the invention has been described with reference to a preferred embodiment, it will be appreciated that variations and modifications can be effected within the ordinary skill in the art without departing from the scope of the invention.

I claim:

1. An improved photographic camera of the type wherein (a) a door is opened to load various speed films into said camera, (b) a manually operated film speed setting member has a plurality of film speed related positions, and (c) a viewfinder window is provided for viewing a subject to be photographed, and wherein the improvement comprises:

means supporting said setting member for movement to a non-film speed related position in which the setting member at least partially blocks said viewfinder window and for movement away from the window to the respective film speed related positions; and means for moving said setting member to the non-film speed related position in response to the opening of said door, whereby when a particular speed film is loaded in said camera a reminder will be provided in said viewfinder window to manually move the setting member to a film speed related position corresponding to the speed of the loaded film.

2. An improved photographic camera of the type wherein (a) a door is opened to load various speed films into said camera, (b) a manually operated film speed setting member has a plurality of film speed related positions, and (c) a viewfinder window is provided for viewing a subject to be photographed, and wherein the improvement comprises:

means supporting said setting member for movement to a non-film speed related position in which the setting member at least partially blocks said viewfinder window and for movement away from the window to the respective film speed related positions;

means mounted on said door for engaging said setting member in the respective film speed related positions when the door is closed, to retain the setting member in a selected film speed related position, and for disengaging said setting member in response to the opening of the door, to release the setting member from the selected position; and means for urging said setting member to the non-film speed setting position, whereby when said door is opened to load a particular speed film in said camera a reminder will be provided in said viewfinder window to manually move the setting member to a film speed related position corresponding to the speed of the loaded film.

3. The improvement as recited in claim 2, wherein said engaging means mounted on said door includes a resiliently flexible engaging member projecting inwardly from the door for engaging said setting member at different locations corresponding to the respective film speed related positions of the setting member, and said supporting means for the setting member supports said setting member for movement generally parallel to said door when the door is closed.

4. The improvement as recited in claim 2, wherein said setting member includes an integral signalling portion which extends across said viewfinder window when the setting member is in the non-film speed related position and is removed from the viewfinder window when said setting member is in the respective film speed related positions.

* * * * *